United States Patent
Yoon

(10) Patent No.: US 7,499,643 B2
(45) Date of Patent: Mar. 3, 2009

(54) AUTHENTICATING PHOTO-SHUTTER SOUND IN MOBILE STATION

(75) Inventor: Du-Hyun Yoon, Seoul (KR)

(73) Assignee: LG Electronics Inc, Seoul (KR)

( * ) Notice: Subject to any disclaimer, the term of this patent is extended or adjusted under 35 U.S.C. 154(b) by 251 days.

(21) Appl. No.: 11/228,061

(22) Filed: Sep. 16, 2005

(65) Prior Publication Data

US 2006/0062563 A1    Mar. 23, 2006

(30) Foreign Application Priority Data

Sep. 18, 2004   (KR) ...................... 10-2004-0074858
Sep. 18, 2004   (KR) ...................... 10-2004-0074867

(51) Int. Cl.
*G03B 17/18*   (2006.01)
*G03B 7/02*   (2006.01)

(52) U.S. Cl. ...................... 396/283; 396/281
(58) Field of Classification Search ............ 396/213, 396/281, 283; 348/207.99, 208.15, 231.4
See application file for complete search history.

(56) References Cited

U.S. PATENT DOCUMENTS

2003/0125008 A1   7/2003   Shimamura
2004/0242263 A1   12/2004   Nishimoto et al.
2005/0286883 A1*  12/2005   Abe et al. .................. 396/266
2007/0032240 A1*  2/2007   Finnegan et al. ............ 455/445

FOREIGN PATENT DOCUMENTS

| CN | 1499453 | | 5/2004 |
| EP | 1445923 A1 | | 8/2004 |
| JP | 2004163563 | | 6/2004 |
| JP | 02005084628 A | * | 3/2005 |
| WO | WO 2004/080064 A1 | | 9/2004 |

* cited by examiner

*Primary Examiner*—Rodney E Fuller
(74) *Attorney, Agent, or Firm*—Lee Hong Degerman Kang & Waimey

(57) ABSTRACT

An apparatus adapted to authenticate a photo-shutter sound in a mobile station comprises a controller adapted to compare a sound level of the photo-shutter sound against a reference level, and a photo-shutter sound determination unit operatively coupled to the controller, adapted to determine whether allow use of the photo-shutter sound by the mobile station based on a result of comparison by the controller. If the sound level of the photo-shutter sound is less than the reference level, then the photo-shutter sound determination unit may determine to forbid downloading of the photo-shutter sound to the mobile station. Alternatively, if the sound level of the photo-shutter sound is less than the reference level, then the photo-shutter sound determination unit may determine to forbid storage of captured images by the mobile station using the photo-shutter sound.

30 Claims, 6 Drawing Sheets

US 7,499,643 B2

AUTHENTICATING PHOTO-SHUTTER SOUND IN MOBILE STATION

CROSS-REFERENCE TO RELATED APPLICATIONS

Pursuant to 35 U.S.C. § 119(a), this application claims the benefit of earlier filing date and right of priority to Korean Application No. 2004-0074858, filed on Sep. 18, 2004, and Korean Application No. 2004-0074867, filed on Sep. 18, 2004, the contents of which are hereby incorporated by reference herein in their entirety.

FIELD OF THE INVENTION

The present invention relates generally to a mobile station and, more particularly, to a photo-shutter sound in a mobile station.

BACKGROUND OF THE INVENTION

Mobile stations may provide a camera, such as a digital camera, for image capture (e.g., picture-taking) and image sharing functions. Such mobile stations may use a LCD (liquid crystal display) and the included digital camera may have a high resolution. A 'photo-shutter' sound (e.g., a sound that mimics a photo shutter) or flash may be provided to warn people in the nearby area that an image is being captured.

FIG. 1 is a block diagram illustrating an apparatus adapted to generate a photo-shutter sound in a mobile station.

Referring to FIG. 1, a mobile station includes a photo-shutter sound storing unit 600 adapted to store a plurality of photo-shutter sounds, a controller 200 adapted to select a preset photo-shutter sound from among the plurality of stored photo-shutter sounds, and a photo-shutter sound output unit 500 adapted to output the selected photo-shutter sound.

FIG. 2 is a flow diagram illustrating a method for generating a photo-shutter sound in a mobile station.

Referring to FIG. 2, a method for generating photo-shutter sounds in a mobile station includes determining whether it is the moment of capturing an object to be photographed (S210), selecting a photo-shutter sound preset by a user when it is the moment of capturing the object to be photographed (S220), and outputting the selected photo-shutter sound (S230).

Referring to FIGS. 1-2, when capturing an object to be photographed as a still image using a camera, the mobile station outputs a photo-shutter sound preset by the user from among at least one photo-shutter sound stored in the photo-shutter sound storing unit 600. These photo-shutter sounds may be downloaded from a Service Provider (SP) server.

The user may preset whether to use a warning flash or a photo-shutter sound from among those stored in the photo-shutter sound storing unit 600. Accordingly, the mobile station generates the preset photo-shutter sound or the warning flash when capturing the object to be photographed.

The controller 200 then determines the moment of capturing the object to be photographed (S210). That is, the controller 200 receives a signal from the CPU (central processing unit) 100 indicating that the moment of capturing the object to be photographed is reached. The controller 200 then determines the moment of capturing the object to be photographed based on the signal received from the CPU 100.

The controller 200 then selects the photo-shutter sound preset by the user at the moment of capturing the object to be photographed (S220). The controller 200 then displays the captured image on a display unit 400 and outputs the selected photo-shutter sound through the photo-shutter sound output unit 500 (e.g., a speaker). The controller 200 may also use a warning flash by, for example, operating light emitting diodes (S230).

However, in a conventional mobile station with image capture capabilities, the photo-shutter sound and/or flash may be 'deactivated' by the user by, for example, selecting a vibration mode or a mute mode as the photo-shutter sound. Such operation may provide opportunity for illicit camera use.

SUMMARY OF THE INVENTION

Accordingly, the present invention is directed to authenticating a photo-shutter sound in a mobile station that substantially obviates one or more problems due to limitations and disadvantages of the related art.

An object of the present invention is to provide authentication of a photo-shutter sound in a mobile station to prevent undetectable image capture. An output level is detected for the photo-shutter sound and the photo-shutter sound is adapted to the detected output level at equal to or greater than a predetermined reference level.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, an apparatus adapted to authenticate a photo-shutter sound in a mobile station comprises a controller adapted to compare a sound level of the photo-shutter sound against a reference level. The apparatus also comprises a photo-shutter sound determination unit operatively coupled to the controller, adapted to determine whether allow use of the photo-shutter sound by the mobile station based on a result of comparison by the controller.

The photo-shutter sound may be adapted to be downloaded to the mobile station, and if the sound level of the photo-shutter sound is less than the reference level, then the photo-shutter sound determination unit may determine to forbid downloading of the photo-shutter sound to the mobile station. Alternatively, the photo-shutter sound may be stored in the mobile station, and if the sound level of the photo-shutter sound is less than the reference level, then the photo-shutter sound determination unit may determine to forbid storage of captured images by the mobile station using the photo-shutter sound.

The apparatus may further comprise a photo-shutter sound storing unit operatively coupled to the controller, adapted to store at least one photo-shutter sound. The apparatus may further comprise a photo-shutter sound output unit operatively coupled to the controller, adapted to output the photo-shutter sound. The reference level may preferably be 65 dB.

The apparatus may further comprise a photo-shutter sound detection unit operatively coupled to the photo-shutter sound determination unit and the controller, adapted to detect the sound level of the photo-shutter sound. The photo-shutter sound may comprise a header containing sound level information. The apparatus may further comprise a photo-shutter sound detection unit operatively coupled to the photo-shutter sound determination unit and the controller, adapted to detect the sound level of the photo-shutter sound based on the sound level information contained in the header of the photo-shutter sound.

In another embodiment, an apparatus adapted to authenticate a photo-shutter sound in a mobile station comprises a controller adapted to compare a sound level of the photo-shutter sound against a reference level. The apparatus also comprises a photo-shutter sound amplification unit operatively coupled to the controller, adapted to amplify the sound level of the photo-shutter sound to at least the reference level, if the sound level of the photo-shutter sound is less than the reference level.

In yet another embodiment, a method for authenticating a photo-shutter sound in a mobile station comprises comparing a sound level of the photo-shutter sound against a reference level. The method also comprises determining whether allow use of the photo-shutter sound by the mobile station based on a result of the comparison step.

The photo-shutter sound may adapted to be downloaded to the mobile station, and the method may further comprise, if the sound level of the photo-shutter sound is less than the reference level, determining to forbid downloading of the photo-shutter sound to the mobile station. Alternatively, the photo-shutter sound may be stored in the mobile station, and the method may further comprise, if the sound level of the photo-shutter sound is less than the reference level, determining to forbid storage of captured images by the mobile station using the photo-shutter sound.

The method may further comprise storing at least one photo-shutter sound in the mobile station. The method may further comprise outputting the photo-shutter sound. The photo-shutter sound may comprise a header containing sound level information, and the method may further comprise detecting the sound level of the photo-shutter sound based on the sound level information contained in the header of the photo-shutter sound.

The method may further comprise, if the sound level of the photo-shutter sound is less than the reference level, displaying a message to indicate why the use of the photo-shutter sound by the mobile station is not allowed.

In still another embodiment, a method for authenticating a photo-shutter sound in a mobile station comprises comparing a sound level of the photo-shutter sound against a reference level. The method also comprises amplifying the sound level of the photo-shutter sound to at least the reference level, if the sound level of the photo-shutter sound is less than the reference level.

The method may further comprise setting an amplified level of the photo-shutter sound as an authenticated level of the photo-shutter sound. The method may further comprise denying storage of an image captured by the mobile station if an unauthenticated level of the photo-shutter sound was used to capture the image.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
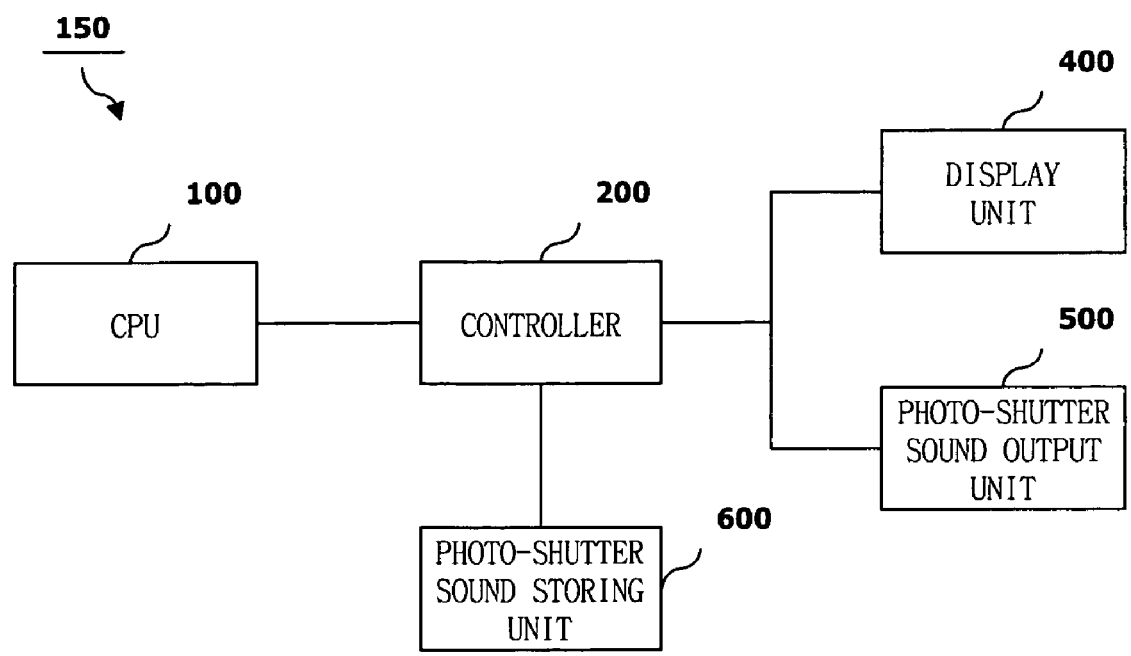
FIG. 1 is a block diagram illustrating an apparatus adapted to generate a photo-shutter sound in a mobile station.
Figure 2:
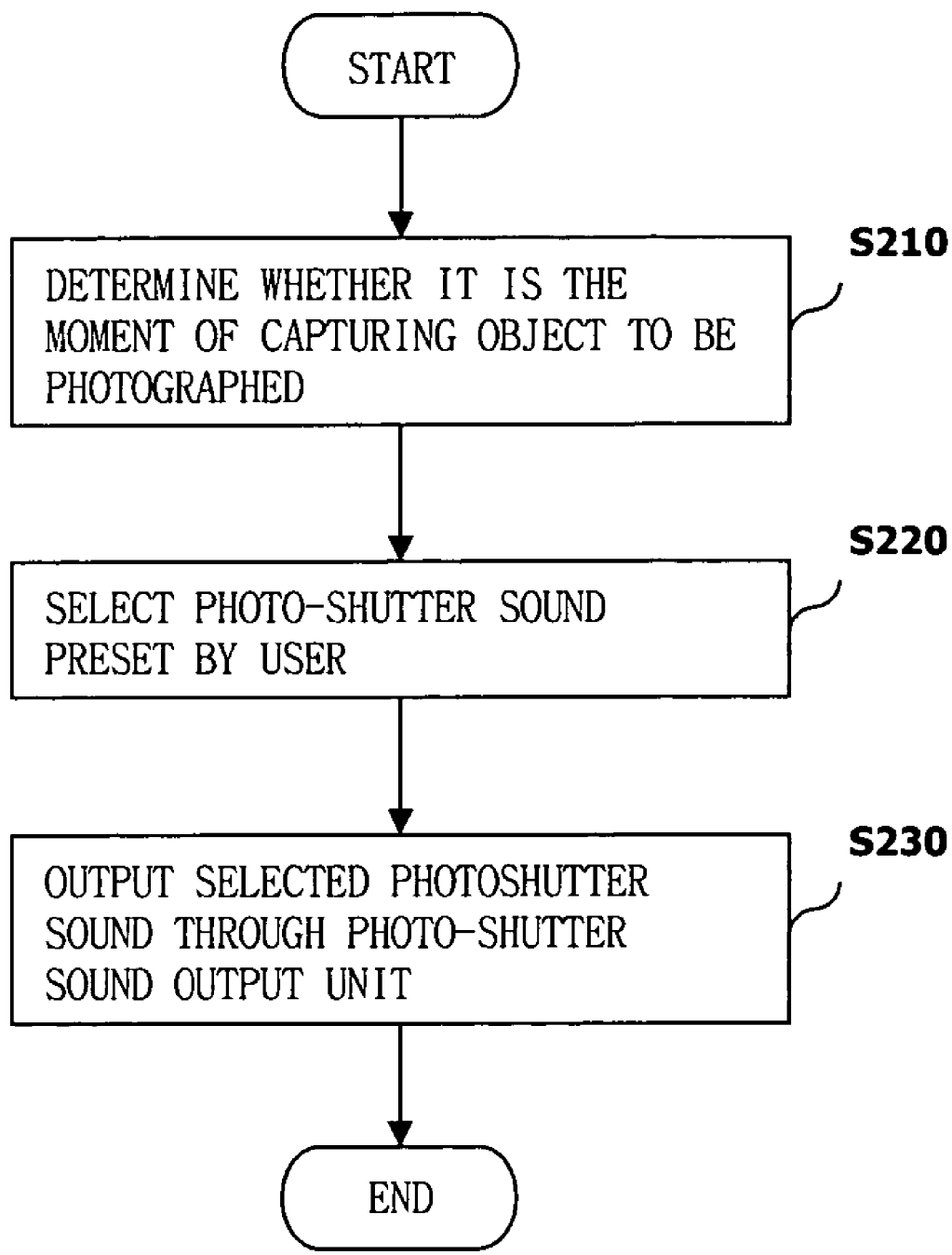
FIG. 2 is a flow diagram illustrating a method for generating a photo-shutter sound in a mobile station.
Figure 3:
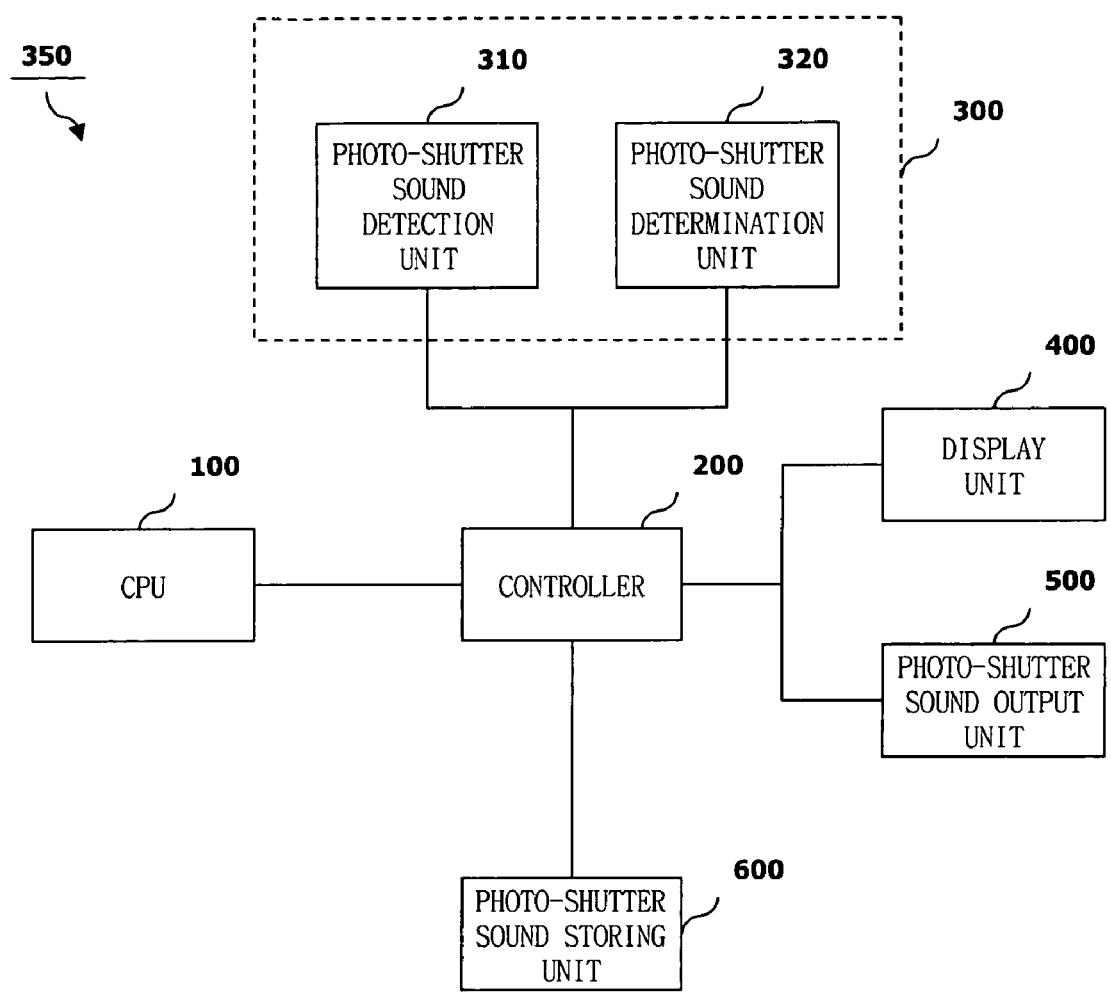
FIG. 3 is a block diagram illustrating an apparatus adapted to authenticate a photo-shutter sound in a mobile station, according to a first embodiment of the present invention.

FIG. 3 is a block diagram illustrating an apparatus 350 adapted to authenticate a photo-shutter sound in a mobile station, according to a first embodiment of the present invention.

Referring to FIG. 3, the apparatus 350 adapted to authenticate a photo-shutter sound in a mobile station includes a controller 200 adapted to compare an output level of a photo-shutter sound selected by a user against a preset reference level and to output a control signal based on the comparison result. The apparatus 350 also includes a photo-shutter sound authentication unit 300 adapted to authenticate the photo-shutter sound based on the control signal. The apparatus also includes a photo-shutter sound storing unit 600 adapted to store the authenticated photo-shutter sound.

Referring again to FIG. 3, the photo-shutter sound authentication unit 300 includes a photo-shutter sound detection unit 310 adapted to detect the output level of the selected photo-shutter sound and output the detected output level thereof. The photo-shutter sound authentication unit 300 also includes a photo-shutter sound determination unit 320 adapted to determine whether to download the selected photo-shutter sound based on the control signal.

Figure 4:
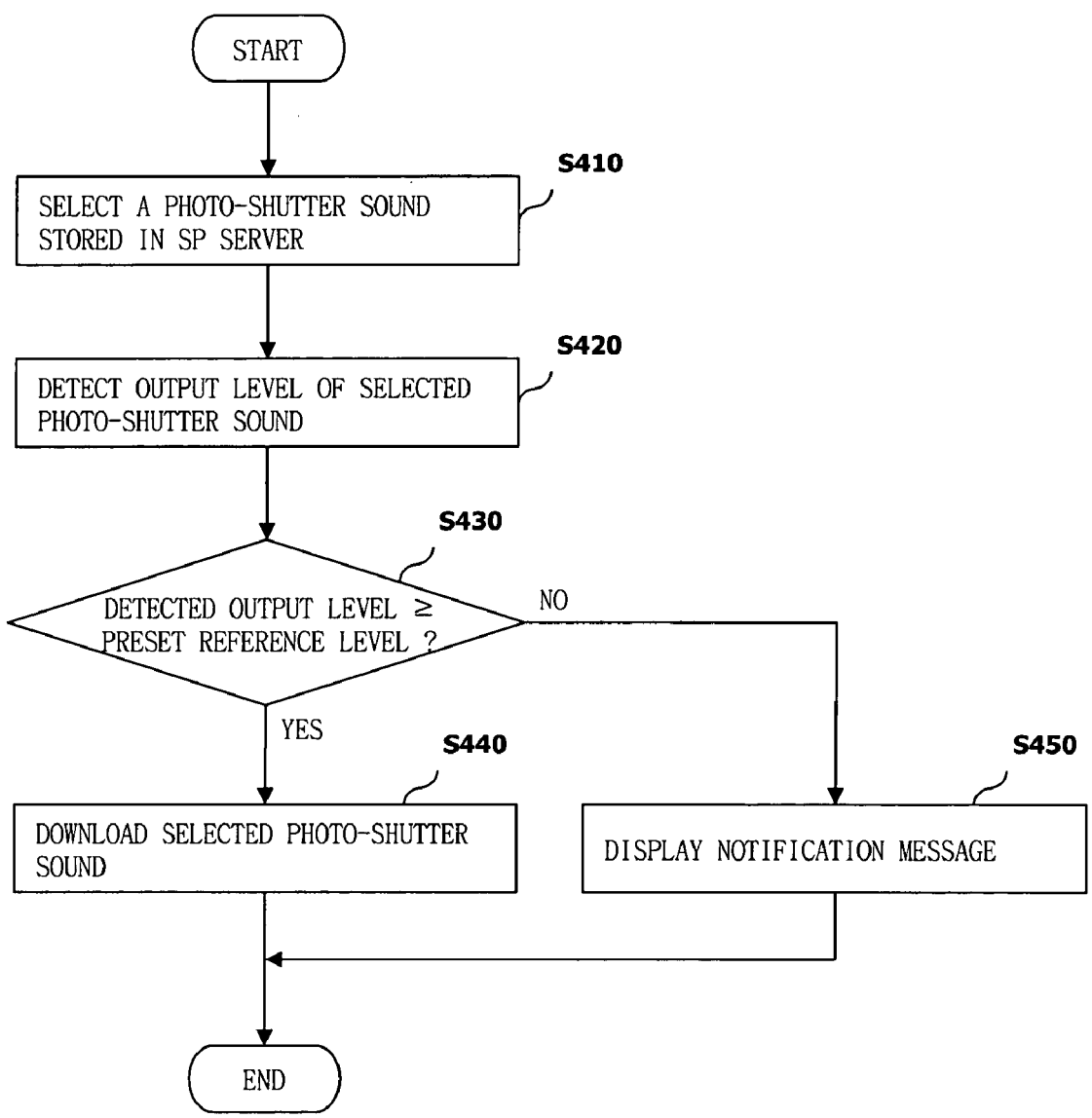
FIG. 4 is a flow diagram illustrating a method for authenticating a photo-shutter sound in a mobile station, according to the first embodiment of the present invention.

FIG. 4 is a flow diagram illustrating a method for authenticating a photo-shutter sound in a mobile station, according to the first embodiment of the present invention.

Referring to FIG. 4, a method for authenticating a photo-shutter sound in a mobile station includes selecting a photo-shutter sound, such as a photo-shutter sound stored in a Service Provider (SP) server (S410). The method also includes detecting an output level of the selected photo-shutter sound (S420) and comparing the detected output level against a preset reference level (S430). The method also includes downloading the selected photo-shutter sound when the detected output level is equal to or greater than the preset reference level (S440). When the detected output level is lower than the preset reference level, the mobile station does not download the selected photo-shutter sound but instead displays a notification message to provide a reason why the downloading of the selected photo-shutter sound is not performed (S450).

Referring again to FIGS. 3-4, when the camera is to capture an image, the mobile station outputs a photo-shutter sound preset by the user from among at least one photo-shutter sound stored in the photo-shutter sound storing unit 600. The photo-shutter sound may be downloaded from a Service Provider (SP) server, for example.

The mobile station may connect to the SP server to select one of the photo-shutter sounds stored in the SP server based on an input from the user (S410). Each photo-shutter sound stored in the SP server may include a preset header region that indicates a sound volume output level thereof. For example, the preset header region may be defined as 3 bits as shown in the below Table 1.

TABLE 1

| Level | Bit | Output |
|---|---|---|
| 1 | 000 | 5 dB |
| 2 | 001 | 15 dB |
| 3 | 010 | 25 dB |
| 4 | 011 | 35 dB |
| 5 | 100 | 45 dB |
| 6 | 101 | 55 dB |
| 7 | 110 | 65 dB |
| 8 | 111 | More than 65 dB |

The mobile station may detect an output level of the selected photo-shutter sound using the preset header region of the selected photo-shutter sound (S420). That is, when the mobile station receives the preset header region of the selected photo-shutter sound, the photo-shutter sound output unit 210 may detect the output level of the received photo-shutter sound using the preset header region and output the detected output level to the controller 200. The controller 200 may compare the detected output level against a preset reference level (S430), and output the comparison result to the photo-shutter sound determination unit 320. The preset reference level may preferably be set to a value of 65 dB or greater, for example.

The photo-shutter sound determination unit 320 determines whether to download the selected photo-shutter sound based on the comparison result. The controller 200 then downloads the selected photo-shutter sound based on the result of the determination by the determination unit 320 (S440). That is, the controller 200 downloads the selected photo-shutter sound when the detected output level is equal to or greater than the preset reference level. Conversely, when the detected output level is lower than the preset reference level, the controller 200 does not download the selected photo-shutter sound but instead displays a notification message using the display unit 400 to provide a reason why the downloading is not performed (S450).

Consequently, when downloading the photo-shutter sound stored in the SP server, the mobile station may detect the output level of the photo-shutter sound and compare the detected output level against the preset reference level, such that only a photo-shutter sound having an output level equal to or greater than the preset reference level is downloaded. The downloaded photo-shutter sound may be stored in the photo-shutter sound storing unit 600. The stored photo-shutter sound may be output based on a user selection when an image is to be captured by the camera.

Figure 5:
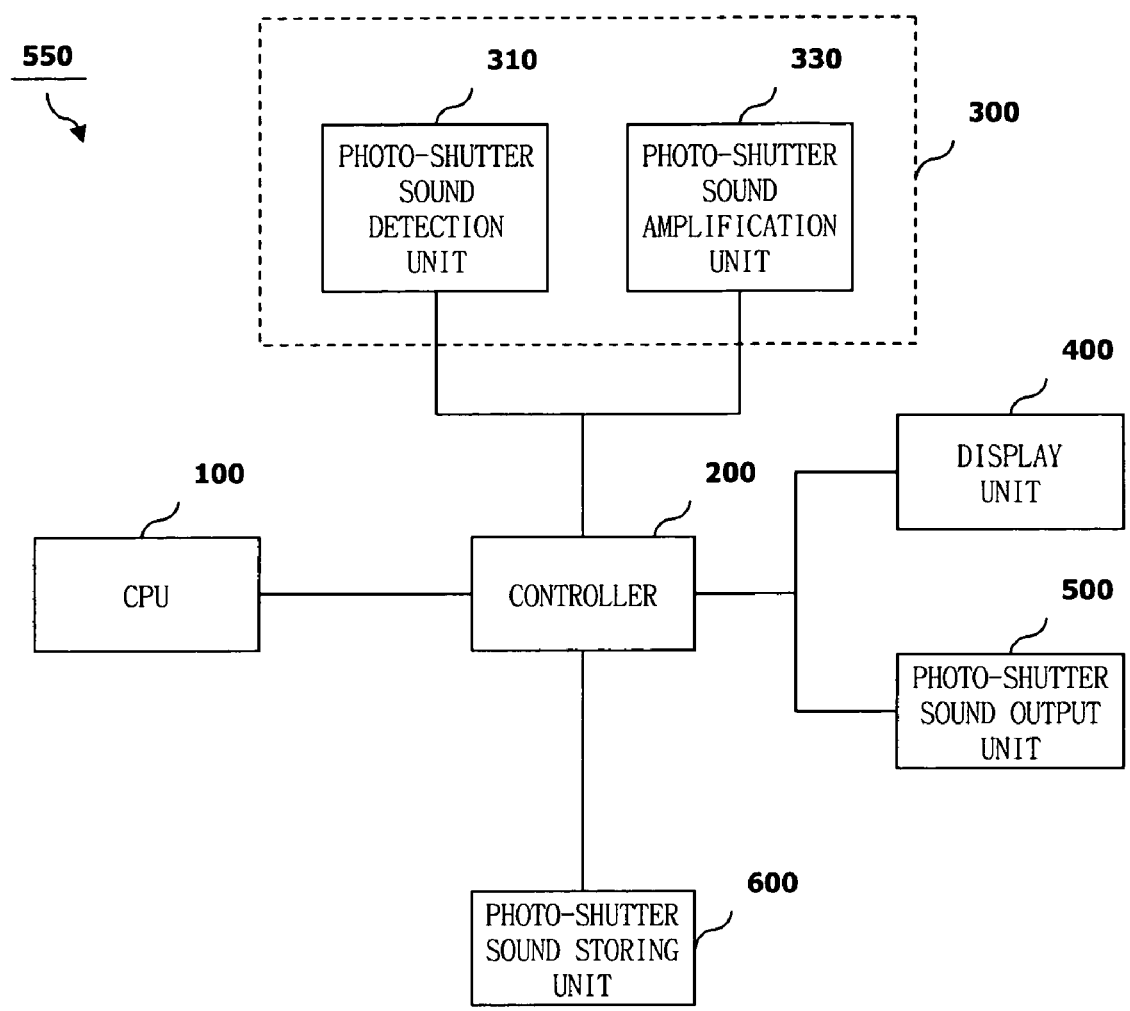
FIG. 5 is a block diagram illustrating an apparatus adapted to authenticate a photo-shutter sound in a mobile station, according to a second embodiment of the present invention.

FIG. 5 is a block diagram illustrating an apparatus 550 adapted to authenticate a photo-shutter sound in a mobile station, according to a second embodiment of the present invention.

Referring to FIG. 5, the apparatus 550 adapted to authenticate a photo-shutter sound in a mobile station includes a controller 200 adapted to compare an output level of an outputted photo-shutter sound against a preset reference level and output a control signal based on the comparison result when an image is to be captured. The apparatus 550 also includes a photo-shutter sound authentication unit 300 adapted to authenticate the photo-shutter sound based on the control signal. The apparatus 550 also includes a display unit 400 adapted to display a message that provides notification of the authentication result. The apparatus 550 also includes a photo-shutter sound storing unit 600 adapted to store the authenticated photo-shutter sound based on a user selection.

Referring again to FIG. 5, the photo-shutter sound authentication unit 300 includes a photo-shutter sound detection unit 310 adapted to detect an output level of the outputted photo-shutter sound and output the detected output level. The photo-shutter sound authentication unit 300 also includes a photo-shutter sound amplification unit 330 adapted to amplify the output level of the outputted photo-shutter sound based on the control signal.

Figure 6:
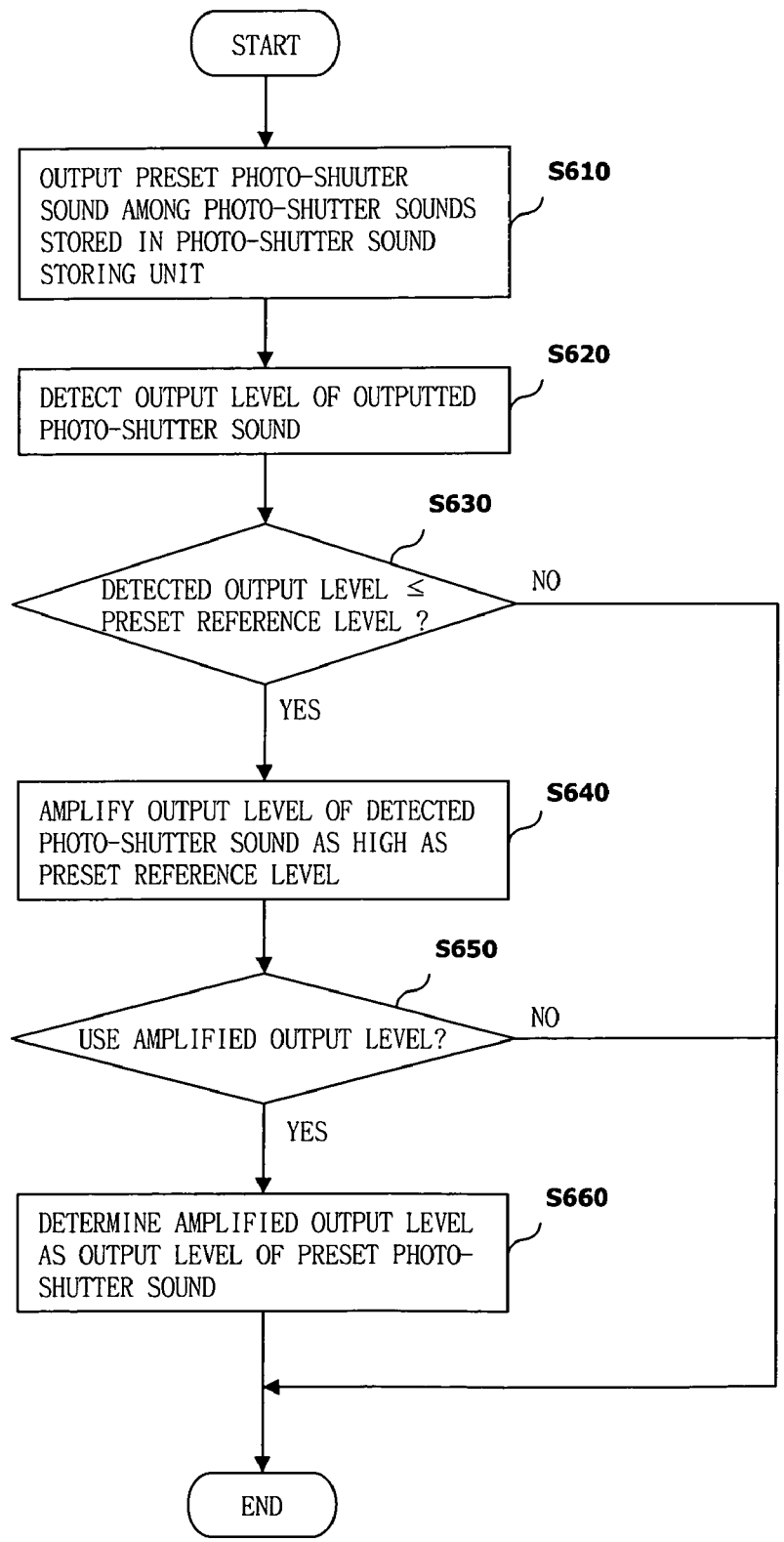
FIG. 6 is a flow diagram illustrating a method for authenticating a photo-shutter sound in a mobile station, according to the second embodiment of the present invention.

FIG. 6 is a flow diagram illustrating a method for authenticating a photo-shutter sound in a mobile station, according to the second embodiment of the present invention.

Referring to FIG. 6, the method for authenticating a photo-shutter sound in a mobile station includes outputting a preset photo-shutter sound when capturing a still image (S610). The method also includes detecting an output level of the outputted photo-shutter sound (S620) and comparing the detected output level against a preset reference level (S630). The method also includes amplifying the output level of the outputted photo-shutter sound when the detected output level is lower than the preset reference level (S640) and confirming whether to use the output level of the amplified photo-shutter sound (S650). The method also includes determining the output level of the amplified photo-shutter sound to be the output level of the preset photo-shutter sound (S660).

Referring again to FIGS. 5-6, when capturing an image (e.g., a still or video image) using the included camera or other included image capture device, the mobile station outputs a photo-shutter sound preset by the user from among at least one photo-shutter sound stored in the photo-shutter sound storing unit 600 (S610). The photo-shutter sound detection unit 310 senses a sound magnitude (e.g., sound volume). When the outputted photo-shutter sound is inputted to the photo-shutter sound detection unit 310, the photo-shutter sound detection unit 310 detects the output level of the inputted photo-shutter sound (S620). The controller 200 receives the detected output level of the photo-shutter sound and compares the received output level of the photo-shutter sound against the preset reference level, and then outputs the comparison result (S630).

The photo-shutter sound amplification unit 330 amplifies the output level of the received photo-shutter sound to a level equal to or greater than the preset reference level based on the comparison result (S640). That is, when the output level of the received photo-shutter sound is equal to or greater than the preset reference level, the photo-shutter sound amplification unit 330 stores the captured still image. Furthermore, the photo-shutter sound amplification unit 330 amplifies the output level of the received photo-shutter sound to a level equal to or greater than the preset reference level when the output level of the received photo-shutter sound is lower than the preset reference level. The controller 200 then performs a user confirmation with respect to whether to continue image capture using the corresponding photo-shutter sound having the amplified output level (S650). That is, the controller 200 displays a message to confirm whether to continue image capture using the corresponding photo-shutter sound having the amplified output level, through the display unit 400. Accordingly, when image capture using the corresponding photo-shutter sound having the amplified output level is not continued, the controller 200 terminates the capturing without storing the captured image.

However, when image capture using the corresponding photo-shutter sound having the amplified output level is continued, the controller 200 does not store the captured image but instead determines the amplified output level to be the output level of the preset photo-shutter sound (S660). As such, the mobile station performs image capture using the amplified output level. The mobile station may then store the captured image after the output level of the photo-shutter sound is amplified.

Accordingly, when the detected output level of the photo-shutter sound is lower than the preset reference level, the mobile station amplifies the detected output level of the photo-shutter sound to a level equal to or greater than the preset reference level and outputs the photo-shutter sound having the amplified output level.

In one embodiment, an apparatus adapted to authenticate a photo-shutter sound in a mobile station comprises a controller adapted to compare a sound level of the photo-shutter sound against a reference level. The apparatus also comprises a photo-shutter sound determination unit operatively coupled to the controller, adapted to determine whether allow use of the photo-shutter sound by the mobile station based on a result of comparison by the controller.

The photo-shutter sound may be adapted to be downloaded to the mobile station, and if the sound level of the photo-shutter sound is less than the reference level, then the photo-shutter sound determination unit may determine to forbid downloading of the photo-shutter sound to the mobile station. Alternatively, the photo-shutter sound may be stored in the mobile station, and if the sound level of the photo-shutter sound is less than the reference level, then the photo-shutter sound determination unit may determine to forbid storage of captured images by the mobile station using the photo-shutter sound.

The apparatus may further comprise a photo-shutter sound storing unit operatively coupled to the controller, adapted to store at least one photo-shutter sound. The apparatus may further comprise a photo-shutter sound output unit operatively coupled to the controller, adapted to output the photo-shutter sound. The reference level may preferably be 65 dB.

The apparatus may further comprise a photo-shutter sound detection unit operatively coupled to the photo-shutter sound determination unit and the controller, adapted to detect the sound level of the photo-shutter sound. The photo-shutter sound may comprise a header containing sound level information. The apparatus may further comprise a photo-shutter sound detection unit operatively coupled to the photo-shutter sound determination unit and the controller, adapted to detect the sound level of the photo-shutter sound based on the sound level information contained in the header of the photo-shutter sound.

In another embodiment, an apparatus adapted to authenticate a photo-shutter sound in a mobile station comprises a controller adapted to compare a sound level of the photo-shutter sound against a reference level. The apparatus also comprises a photo-shutter sound amplification unit operatively coupled to the controller, adapted to amplify the sound level of the photo-shutter sound to at least the reference level, if the sound level of the photo-shutter sound is less than the reference level.

In yet another embodiment, a method for authenticating a photo-shutter sound in a mobile station comprises comparing a sound level of the photo-shutter sound against a reference level. The method also comprises determining whether allow use of the photo-shutter sound by the mobile station based on a result of the comparison step.

The photo-shutter sound may adapted to be downloaded to the mobile station, and the method may further comprise, if the sound level of the photo-shutter sound is less than the reference level, determining to forbid downloading of the photo-shutter sound to the mobile station. Alternatively, the photo-shutter sound may be stored in the mobile station, and the method may further comprise, if the sound level of the photo-shutter sound is less than the reference level, determining to forbid storage of captured images by the mobile station using the photo-shutter sound.

The method may further comprise storing at least one photo-shutter sound in the mobile station. The method may further comprise outputting the photo-shutter sound. The photo-shutter sound may comprise a header containing sound level information, and the method may further comprise detecting the sound level of the photo-shutter sound based on the sound level information contained in the header of the photo-shutter sound.

The method may further comprise, if the sound level of the photo-shutter sound is less than the reference level, displaying a message to indicate why the use of the photo-shutter sound by the mobile station is not allowed.

In still another embodiment, a method for authenticating a photo-shutter sound in a mobile station comprises comparing a sound level of the photo-shutter sound against a reference level. The method also comprises amplifying the sound level of the photo-shutter sound to at least the reference level, if the sound level of the photo-shutter sound is less than the reference level.

The method may further comprise setting an amplified level of the photo-shutter sound as an authenticated level of the photo-shutter sound. The method may further comprise denying storage of an image captured by the mobile station if an unauthenticated level of the photo-shutter sound was used to capture the image.

The present invention provides for authentication of a photo-shutter sound in a mobile station having image capture capabilities (e.g., a camera). Such authentication may prevent images from being stored when the corresponding photo-shutter sound is not authenticated, i.e. when the sound volume (e.g., sound level) of the photo-shutter sound is not at or above a reference level. Alternatively, the authentication may prevent downloading of photo-shutter sounds to the mobile station when the sound volume (e.g., sound level) of the photo-shutter sound is not at or above a reference level.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. An apparatus configured to authenticate a photo-shutter sound in a mobile station, the apparatus comprising:
    a controller to compare a volume level of the photo-shutter sound to a reference level; and
    a photo-shutter sound determination unit operatively coupled to the controller and configured to determine whether to allow use of the photo-shutter sound by the mobile station based on a result of the comparison by the controller, wherein the photo-shutter sound comprises a header containing volume level information.

2. The apparatus of claim 1, wherein the photo shutter sound is downloadable to the mobile station and the photo-shutter sound determination unit determines to forbid downloading of the photo-shutter sound to the mobile station if the volume level of the photo-shutter sound is less than the reference level.

3. The apparatus of claim 1, wherein the photo-shutter sound can be stored in the mobile station and the photo-shutter sound determination unit determines to forbid storage of captured images by the mobile station using the photo-shutter sound if the volume level of the photo-shutter sound is less than the reference level.

4. The apparatus of claim 1, further comprising a photo-shutter sound storing unit operatively coupled to the controller and configured to store at least one photo-shutter sound.

5. The apparatus of claim 1, further comprising a photo-shutter sound output unit operatively coupled to the controller and configured to output the photo-shutter sound.

6. The apparatus of claim 1, wherein the reference level is 65 dB.

7. The apparatus of claim 1, further comprising a photo-shutter sound detection unit operatively coupled to the photo-shutter sound determination unit and the controller and configured to detect the volume level of the photo-shutter sound.

8. The apparatus of claim 1, further comprising a photo-shutter sound detection unit operatively coupled to the photo-shutter sound determination unit and the controller and configured to detect the volume level of the photo-shutter sound based on the volume level information contained in the header of the photo-shutter sound.

9. The apparatus of claim 1, wherein the photo-shutter sound is downloaded to the mobile station.

10. An apparatus configured to authenticate a photo-shutter sound in a mobile station, the apparatus comprising:

a controller configured to compare a sound level of the photo-shutter sound to a reference level; and a photo-shutter sound amplification unit operatively coupled to the controller and configured to amplify the sound level of the photo-shutter sound to at least the reference level if the sound level of the photo-shutter sound is less than the reference level, wherein the photo-shutter sound comprises a header containing sound level information.

11. The apparatus of claim 10, further comprising a photo-shutter sound storing unit operatively coupled to the controller and configured to store at least one photo-shutter sound.

12. The apparatus of claim 10, further comprising a photo-shutter sound output unit operatively coupled to the controller and configured to output the photo-shutter sound.

13. The apparatus of claim 10, wherein the reference level is 65 dB.

14. The apparatus of claim 10, further comprising a photo-shutter sound detection unit operatively coupled to the photo-shutter sound determination unit and the controller and configured to detect the sound level of the photo-shutter sound.

15. The apparatus of claim 10, further comprising a photo-shutter sound detection unit operatively coupled to the photo-shutter sound determination unit and the controller and configured to detect the sound level of the photo-shutter sound based on the sound level information contained in the header of the photo-shutter sound.

16. A method for authenticating a photo-shutter sound in a mobile station, the method comprising:

comparing a volume level of the photo-shutter sound to a reference level; and determining whether to allow use of the photo-shutter sound by the mobile station based on a result of the comparison, wherein the photo-shutter sound comprises a header containing volume level information.

17. The method of claim 16, wherein the photo-shutter sound is downloadable to the mobile station and the method further comprises:

determining to forbid downloading of the photo-shutter sound to the mobile station if the volume level of the photo-shutter sound is less than the reference level.

18. The method of claim 16, wherein the photo-shutter sound can be stored in the mobile station and the method further comprises:

determining to forbid storage of captured images by the mobile station using the photo-shutter sound if the volume level of the photo-shutter sound is less than the reference level.

19. The method of claim 16, further comprising:

storing at least one photo-shutter sound in the mobile station.

20. The method of claim 16, further comprising:

outputting the photo-shutter sound.

21. The method of claim 16, further comprising:

detecting the volume level of the photo-shutter sound based on the volume level information contained in the header of the photo-shutter sound.

22. The method of claim 16, further comprising:

displaying a message to indicate why use of the photo-shutter sound by the mobile station is not allowed if the volume level of the photo-shutter sound is less than the reference level.

23. The method of claim 16, further comprising:

downloading the photo-shutter sound to the mobile station.

24. A method for authenticating a photo-shutter sound in a mobile station, the method comprising:

comparing a sound level of the photo-shutter sound to a reference level; and amplifying the sound level of the photo-shutter sound to at least the reference level, if the sound level of the photo-shutter sound is less than the reference level, wherein the photo-shutter sound comprises a header containing sound level information.

25. The method of claim 24, further comprising:

storing at least one photo-shutter sound in the mobile station.

26. The method of claim 24, further comprising:

outputting the photo-shutter sound.

27. The method of claim 24, further comprising:

detecting the sound level of the photo-shutter sound based on the sound level information contained in the header of the photo-shutter sound.

28. The method of claim 24, further comprising:

setting the amplified level of the photo-shutter sound as an authenticated level of the photo-shutter sound.

29. The method of claim 28, further comprising:

denying storage of an image captured by the mobile station if the amplified sound level of the photo-shutter sound was not authenticated.

30. The method of claim 28, further comprising:

displaying a message to indicate why the use of the photo-shutter sound was not Authenticated by the mobile station if the amplified sound level of the photo-shutter sound was not authenticated.

* * * * *